United States Patent
Geraci

(10) Patent No.: US 10,735,779 B2
(45) Date of Patent: Aug. 4, 2020

(54) METHOD AND SYSTEM FOR TARGETED BROADCAST ADVERTISING

(71) Applicant: PAYPAL, INC., San Jose, CA (US)

(72) Inventor: Chad Anthony Geraci, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 95 days.

(21) Appl. No.: 15/378,027

(22) Filed: Dec. 13, 2016

(65) Prior Publication Data

US 2017/0094325 A1    Mar. 30, 2017

Related U.S. Application Data

(63) Continuation of application No. 13/529,905, filed on Jun. 21, 2012, now abandoned.

(51) Int. Cl.
| | | |
|---|---|---|
| *H04N 21/234* | (2011.01) | |
| *H04N 21/478* | (2011.01) | |
| *H04N 21/81* | (2011.01) | |
| *H04N 21/431* | (2011.01) | |
| *H04N 21/488* | (2011.01) | |

(52) U.S. Cl.
CPC ... *H04N 21/23424* (2013.01); *H04N 21/4316* (2013.01); *H04N 21/47815* (2013.01); *H04N 21/4884* (2013.01); *H04N 21/812* (2013.01)

(58) Field of Classification Search
USPC .......................................................... 705/14
See application file for complete search history.

(56) References Cited

U.S. PATENT DOCUMENTS

| | | | |
|---|---|---|---|
| 2004/0268419 A1 | 12/2004 | Danker et al. | |
| 2005/0137958 A1 | 6/2005 | Huber et al. | |
| 2005/0273828 A1 | 12/2005 | Barton | |
| 2007/0089150 A1 | 4/2007 | Bowler | |
| 2008/0221989 A1 | 9/2008 | Messer et al. | |
| 2009/0006191 A1* | 1/2009 | Arankalle | G06Q 30/02 705/14.71 |
| 2009/0048910 A1 | 2/2009 | Shenfield et al. | |
| 2009/0235312 A1* | 9/2009 | Morad | G06Q 30/02 725/44 |
| 2009/0293086 A1 | 11/2009 | Lutterbach et al. | |

(Continued)

FOREIGN PATENT DOCUMENTS

WO    WO 2001093161    12/2001

OTHER PUBLICATIONS

Semantic Multimedia Extraction Using Audio and Video (Year: 2012).*

(Continued)

*Primary Examiner* — Gautam Ubale
(74) *Attorney, Agent, or Firm* — Haynes and Boone, LLP

(57) ABSTRACT

A system and a method for using the system for targeted broadcast advertising includes a broadcasting medium are provided. The system includes a broadcaster configured to provide a multimedia stream to a viewing device through the broadcasting medium; the multimedia stream including a close captioning string; wherein: the broadcaster is further configured to provide advertisements in the multimedia stream according to a correlation between the close captioning string and a plurality of vendor keywords.

18 Claims, 6 Drawing Sheets

(56) References Cited

U.S. PATENT DOCUMENTS

| | | | |
|---|---|---|---|
| 2010/0042499 A1* | 2/2010 | Barton | G06Q 30/02 |
| | | | 705/14.53 |
| 2010/0153831 A1* | 6/2010 | Beaton | G06Q 30/02 |
| | | | 715/201 |
| 2011/0029400 A1* | 2/2011 | Scipioni | G06F 21/36 |
| | | | 705/26.4 |
| 2011/0138412 A1 | 6/2011 | Roberts et al. | |
| 2011/0179445 A1* | 7/2011 | Brown | G06Q 30/02 |
| | | | 725/32 |
| 2011/0185384 A1* | 7/2011 | Wang | G06Q 30/02 |
| | | | 725/34 |
| 2011/0202270 A1 | 8/2011 | Sharma et al. | |
| 2011/0314485 A1* | 12/2011 | Abed | G06F 17/30796 |
| | | | 725/14 |
| 2012/0297406 A1 | 11/2012 | Bartholomay et al. | |
| 2012/0304065 A1 | 11/2012 | Cai | |
| 2013/0007799 A1* | 1/2013 | Sandoval | H04N 21/237 |
| | | | 725/32 |

OTHER PUBLICATIONS

VideoSense A Contextual In-Video Advertising System (Year: 2009).*

* cited by examiner

METHOD AND SYSTEM FOR TARGETED BROADCAST ADVERTISING

CROSS REFERENCED TO RELATED APPLICATIONS

This continuation patent application claims priority to and the benefit of U.S. patent application Ser. No. 13/529,905, filed Jun. 21, 2012, the contents of which are incorporated by reference in its entirety.

BACKGROUND

Field of the Invention

Embodiments disclosed herein relate generally to the field of broadcast advertising for multiple media applications; more particularly, embodiments disclosed herein relate to the field of targeted broadcast advertising.

Description of Related Art

In state-of-the-art advertising, commercials may not be correlated with a broadcasting program, be it a TV show or a video downstream from a media outlet. Therefore, vendors may miss opportunities to pitch appropriate products to viewers, and on occasions vendors may pitch products to inappropriate audiences, wasting resources. Typically, advertising strategies are matched to audiences modeled by broadcasters prior to broadcasting, based on marketing strategies, program ratings, and program schedules. While these models have become increasingly complicated, there are still inefficiencies in the strategies used.

Moreover, with the advent of new consumer electronic devices and network capabilities, potential consumers may be watching a program at any time of the day, in any place. Audiences have become dispersed geographically and chronologically, making many of currently amended marketing models obsolete and inappropriate.

What is needed is an alternative method of payment for online commerce that is flexible and increases a sales opportunity for the buyer and the vendor.

BRIEF DESCRIPTION OF THE DRAWINGS

In the figures, elements having the same reference number have the same or similar functions.

DETAILED DESCRIPTION

Figure 1:
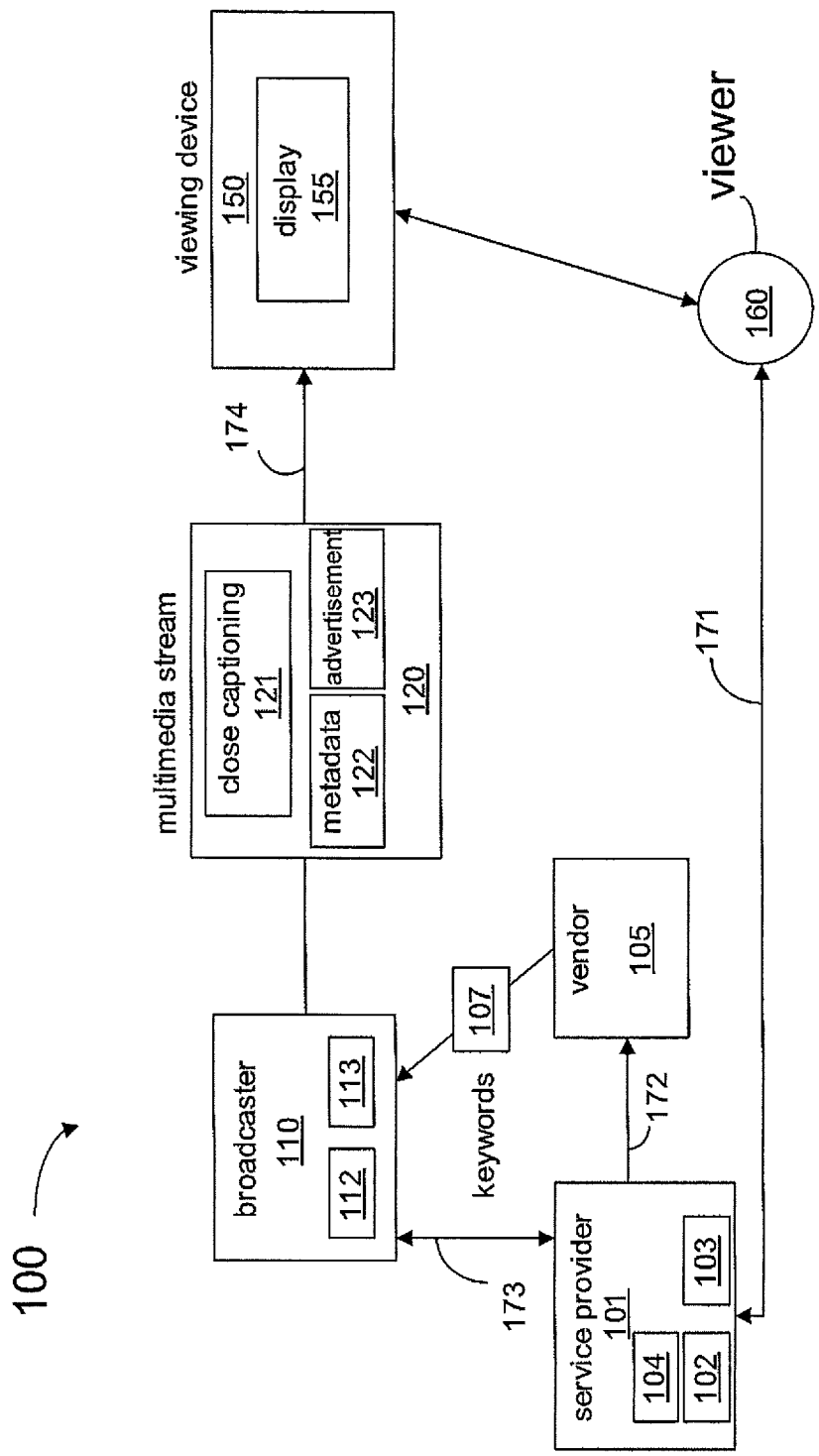
FIG. 1 shows a system for targeted broadcast advertising, according to some embodiments.

According to some embodiments a system for targeted broadcast advertising includes a broadcasting medium; and a broadcaster configured to provide a multimedia stream to a viewing device through the broadcasting medium; the multimedia stream including a close captioning string; wherein: the broadcaster is further configured to provide advertisements in the multimedia stream according to a correlation between the close captioning and a plurality of vendor keywords.

According to some embodiments, a system including a server the server including a processor circuit and a memory circuit, wherein: the processor circuit is configured to provide a broadcast link to a broadcaster through a network provider, the broadcast link embedded in an advertisement, and to provide a viewer wish list to the broadcaster, the viewer wish list including items of interest for a viewer; the processor circuit is configured to access a vendor account through a link in a network provider, and to store the vendor account information in the memory circuit; the processor circuit is configured to access an account for the viewer through a link in a network provider; and the processor circuit is configured to transfer funds from the viewer account to the vendor account upon a viewer selection of the broadcast link.

According to some embodiments, a network provider includes a broadcast link to a broadcaster providing a multimedia stream to a viewer; a vendor link to a vendor; a server link to a server having a viewer account and a vendor account; and a processing circuit configured to provide an advertisement in the multimedia stream according to a correlation between a multimedia stream metadata, a multimedia close captioning, and a plurality of vendor keywords, the advertisement including a link to the server.

In some embodiments, a non-transitory machine-readable medium includes a plurality of machine-readable instructions which when executed by one or more processors of a broadcaster are adapted to cause the broadcaster to perform a method including: broadcasting a multimedia stream to a viewing device through a broadcasting medium, the multimedia stream comprising a close captioning stream; finding correlation values between the close captioning stream and a plurality of vendor keywords; and providing advertisements in the multimedia stream according to the correlation values.

According to embodiments disclosed herein, a method for targeted broadcast advertising may include storing, electronically in a memory circuit of a broadcaster a plurality of keywords related to an item for sale by a vendor; finding, electronically by a processor circuit in the broadcaster correlation values between vendor keywords and a close captioning in a multimedia stream; placing, electronically by the processor circuit an advertisement field for the item at selected locations in the multimedia stream according to the correlation values; placing, electronically by the processor circuit a payment tab on the advertisement field; and displaying an advertisement in the advertisement field at predetermined events performed by a viewer accessing the multimedia stream.

Embodiments in this disclosure include methods and systems for using closed captioning to provide targeted advertisements to viewers of a broadcast. The broadcast may include a multimedia stream provided through a broadcast medium. The broadcast medium may be open space, electrical cables and wires, fiber optics networks, or a combination of the above. Targeted advertisements are relevant to the broadcast content so that the viewer will be naturally interested in the advertisement. In any given program broadcast including video, close captioning is keyword rich by nature. Thus, using close captioning in a broadcast to match a keyword of interest for advertising provides vendors an appropriate moment and an appropriate audience to advertise a product or service. According to some embodiments, a broadcaster queries the closed captioning text and matches specific products or terms with advertisements that either are the exact product that is being mentioned or share enough similarity with the product such that the advertisement is "relevant." The similarity between the advertised product and the content of the multimedia stream may be measured using a correlation between a vendor provided keyword and the close captioning text. Such correlation may be in the form of a language correlation. This could be seen as having even greater relevance if the keyword for the item is included in the close captioning, and an item matching the keyword description is visually displayed in the program.

FIG. 1 shows a system 100 for targeted broadcast advertising according to some embodiments. System 100 includes a service provider 101, a vendor 105, and a broadcaster 110. Broadcaster 110 generates a multimedia stream 120 that is received by a viewer 160 on a viewing device 150 including a display 155. Viewing device 150 may receive multimedia stream 120 via a free space antenna (such as a dish), a cable connection, or any other form of network connection through network link 174. Viewing device 150 may be a TV display, a cell phone, a laptop, a computing tablet, a smart phone, or a desktop computer.

Broadcaster 110 may be a traditional TV station or network, or a web-based server providing video content. For example, broadcaster 110 may be a news outlet operating in the internet, a video source linked to a search engine, or a server providing movies to registered users. Broadcaster 110 may include a computer having a processor circuit 112 and a memory circuit 113. Thus, the operations of broadcaster 110 as described in detail below may be performed electronically by processor 112 according to commands and data stored in memory 113.

FIG. 1 also illustrates a service provider 101, such as PayPal, Inc. of San Jose, Calif., having a link 171 to viewer 160, a link 172 to vendor 105 and a link 173 to broadcaster 110. Each one of links 171, 172, 173 and 174 may be part of a network. For example, links 171, 172, 173 and 174 may be a cell phone network, a wireless network, an Ethernet network, or any combination of the above. In some embodiments, link 171 may be a cell phone network between service provider 101 and viewer 160. Thus, in some embodiments vendor 105 may be a registered user of service provider 101. In some embodiments, viewer 160 may also be a registered user of service provider 101. In some embodiments, service provider 101 may include a computer having a processor circuit 102 and a memory circuit 103. Thus, the operations of service provider 101 as described below may be performed electronically by processor 102 following commands and using data stored in memory 103.

Vendor 105 may use an account in service provider 101 to provide a remote payment mechanism in advertisement 123. Viewer 160 may use an account in service provider 101 to pay for an item using the remote payment option placed by broadcaster 110 for vendor 105, in advertisement 123. Further according to some embodiments, viewer 160 may provide a 'wish list' 104 to service provider 101. Wish list 104 includes lists of items that viewer 160 may be interested in purchasing. Wish list 104 may include a generic list of items, such as 'books', or 'men's clothing', or 'women's clothing'. In some embodiments, wish list 104 may be more specific, such as 'sport's cars', 'surfing gear', 'women's shoes', or the like. Items in wish list 104 may include also services such as 'travel' or 'mobile phone plans' or 'health'. Service provider 101 may store wish list 104 in memory circuit 103, associated to a private account of viewer 160 with service provider 101.

In some embodiments, broadcaster 110 provides multimedia stream 120 through a broadcasting medium. Multimedia stream 120 may include metadata 122 and a close captioning string 121. In some embodiments, broadcaster 110 provides advertisements 123 in multimedia stream 120 according to a correlation between metadata 122, close captioning 121, and a plurality of vendor keywords 107. Vendor keywords 107 are provided by vendor 105 to broadcaster 110 upon a contract agreement. Vendor keywords 107 describe or characterize the main aspects of a product offered for sale by vendor 105.

In some embodiments, service provider 101 provides wish list 104 to broadcaster 110. In such embodiments, broadcaster 110 may further use wish list 104 to perform a correlation with metadata 122, close captioning 121, and vendor keywords 107, specifically targeted for viewer 160. In such embodiments, broadcaster 110 may have information as to the identity of viewer 160 prior to, or during, the broadcasting of multimedia stream 120 to viewer 160. This information may be obtained by broadcaster 110 for example when viewer 160 logs in to access a program content from broadcaster 110. In some embodiments, wish list 104 may be provided to broadcaster 110 after viewer 160 has used an account in service provider 101 with a link provided by broadcaster 110. Based on the correlation, broadcaster 110 may determine a targeted advertising to display for viewer 160. The targeted advertisement may best match the viewer's expressed interest on an item to a broadcast content being down-streamed to the viewer.

While FIG. 1 illustrates element 105 as a vendor, it should be understood by those of ordinary skill that element 105 may be any organization that collects funds through advertisement. For example, a non-profit organization dedicated to charity or any other activity using fresh funds from the public may use methods and systems for targeted broadcast advertising as disclosed herein. In this regard, aid organizations established on a permanent basis (disease research or vaccination campaigns) or in natural disasters, may use methods and systems for targeted broadcast advertising as disclosed herein.

Figure 2:
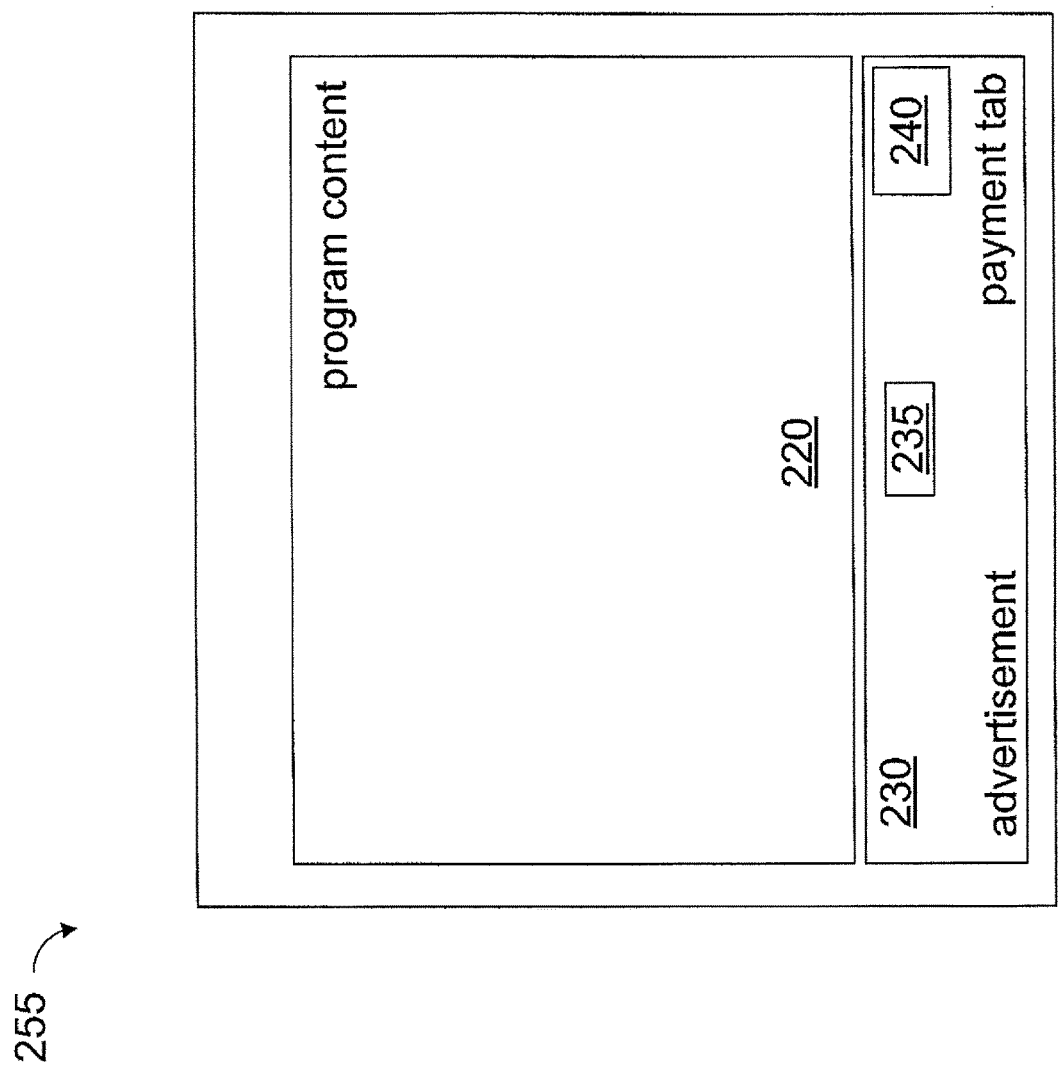
FIG. 2 shows a display in a system for targeted broadcast advertising, according to some embodiments.

FIG. 2 shows a display 255 in a system for targeted broadcast advertising, according to some embodiments. Display 255 includes a canvas 220 to display the program content, and an advertisement field 230 to display an advertisement. In some embodiments advertisement field 230 includes a payment tab 240. In some embodiments payment tab 240 may be provided by private account service provider 101. Thus, a viewer interested in purchasing some of the advertised products may select payment tab 240 and complete a transaction while watching the program broadcasted by broadcaster 110. According to some embodiments, advertisement field 230 may display advertisements 123 while program content 220 is streaming continuously. Thus, advertisements 123 may be placed in advertisement field 230 according to a strong correlation with the streaming close caption string 121, the visual display in program content 220, and keywords 107.

Broadcaster 110 displays advertisement 123 in multimedia stream 120 when a specific product name has been mentioned in closed captioning 121. In some embodiments, broadcaster 110 displays advertisement 123 when a correlation match occurs for a vendor's product in relation to close captioning 121, metadata 122, and wish list 104. In some embodiments broadcaster 110 displays advertisement 123 when a specific product name appears in close captioning 121 and the product is also visually displayed in a frame in broadcast program 220. In some embodiments broadcaster 110 displays advertisement 123 when a generic item is mentioned in close captioning 121 in the broadcast program. The generic item may be related to vendor keywords 107, or a viewer's wish list 104. In some embodiments broadcaster 110 displays advertisement 123 when a generic item is mentioned in close captioning 121 and shown in the broadcast program.

Further according to embodiments consistent with the present disclosure, broadcaster 110 displays advertisement 123 when a correlation match occurs between close captioning 121 and wish list 104. In some embodiments, broadcaster 110 compares a correlation match to wish list 104, if there is a match, displaying advertisement 123 may include a premium cost to vendor 105. Further according to some embodiments, broadcaster 110 may display advertisement 123 in multimedia stream 120 for products or services in wish list 104 matching vendor keywords 107. According to some embodiments, the added revenue for placing advertisement 123 using wish list 104 may be shared between service provider 101 and broadcaster 110, according to a contract agreement. In some embodiments broadcaster 110 may access wish list 104 in memory chip 103 of service provider 101 through link 173. In some embodiments, service provider 101 may provide wish list 104 through link 173 to be stored in memory circuit 113 with broadcaster 110.

Broadcaster 110 may select to display advertisement 123 for viewer 160 at any point during broadcast. Accordingly, broadcaster 110 may display advertisement 123 in multimedia stream 120 while program content 220 is paused by viewer 160. Thus, more than one advertisement 123 may be displayed by broadcaster 110, if more than one vendor item has obtained a high correlation value. According to some embodiments, broadcaster 110 may store in memory circuit 113 a number of vendor items that have reached a high correlation value between a first point in multimedia stream 120 and a second point in multimedia stream 120. For example, the first point and the second point in multimedia stream 120 may be a 'pause' action by viewer 160 in the program. In some embodiments, a first point in multimedia stream 120 may be the start of program content 220, and a second point in multimedia stream 120 may be the end of program content 220.

According to some embodiments, viewer 160 may pause program content 220 when an item of interest is advertised in advertisement field 230. Upon pausing program content 220, the viewer may use payment tab 240 to purchase the advertised product, such as by selecting payment tab 240 via a remote control device, a user touch, or a pointing device. Further according to some embodiments, display of advertisement field 230 may be optional, by viewer 160. Thus, viewer 160 may select to clear advertisement field 230 for certain portions of the broadcast. In such embodiments, viewer 160 may decide to turn advertisement field 230 'on' when an item of interest appears on display 255. Viewer 160 may decide to turn advertisement field 230 'on' when an item or service of interest is mentioned in the context of program content 220. Further according to some embodiments, advertisement field 230 may include a 'skip add' tab 235, so that viewer 160 may remove advertisement 230 at a given time. For example, 'skip add' tab 235 may appear on advertisement field 230 after a certain period of time, predetermined by broadcaster 110. The period of time may be determined upon a contract between broadcaster 110 and vendor 105.

In some embodiments, viewer 160 may be a registered user with service provider 101, having an account login and a password or personal identification number (PIN). Thus, when viewer 160 presses or taps on payment tab 240, broadcaster 110 may link viewer 160 to service provider 101 through link 173. Viewer 160 may then be prompted to enter account login information and a password or PIN, to access a private funds account with service provider 101. When doing so, viewer 160 may then finalize the purchase of the product advertised in advertisement field 230. In some embodiments, service provider 101 may contact viewer 160 through link 171 to authenticate and complete the purchase.

In some embodiments consistent with the present disclosure, once the purchase is authenticated by viewer 160 through link 171, service provider 101 may contact vendor 105 through link 172 to provide details of the purchase. Furthermore, according to some embodiments vendor 105 may also be a registered user of service provider 101. Thus, service provider 101 may transfer funds from a viewer account to a vendor account within service provider 101 after the purchase has been authenticated by viewer 160.

As a method of authentication, viewer 160 may enter a mobile number and personal identification number (PIN). The mobile number and PIN may be stored in memory circuit 103 within service provider 101, associated to a viewer's private account. Once service provider 101 verifies the viewer's account, the purchase is completed and service provider 101 transfers funds from the viewer's to the vendors account. According to some embodiments, the fund transfer may take a few minutes, or even less. Upon successful fund transfer, viewer 160 receives a confirmation screen and a receipt from service provider 101. In some embodiments, service provider 101 sends a receipt to viewer 160 in email form, through link 171. In such embodiments, the subject line would read "Receipt from X merchant" and contain details of the purchase including total, date, and time. In some embodiments an e-mail receipt from service provider 101 to viewer 160 may include offers of related items from the vendor. In some embodiments, further offers of vendor's product included in a communication from service provider 101 to viewer 160 may be part of a contract between vendor 105 and service provider 101.

Figure 3:
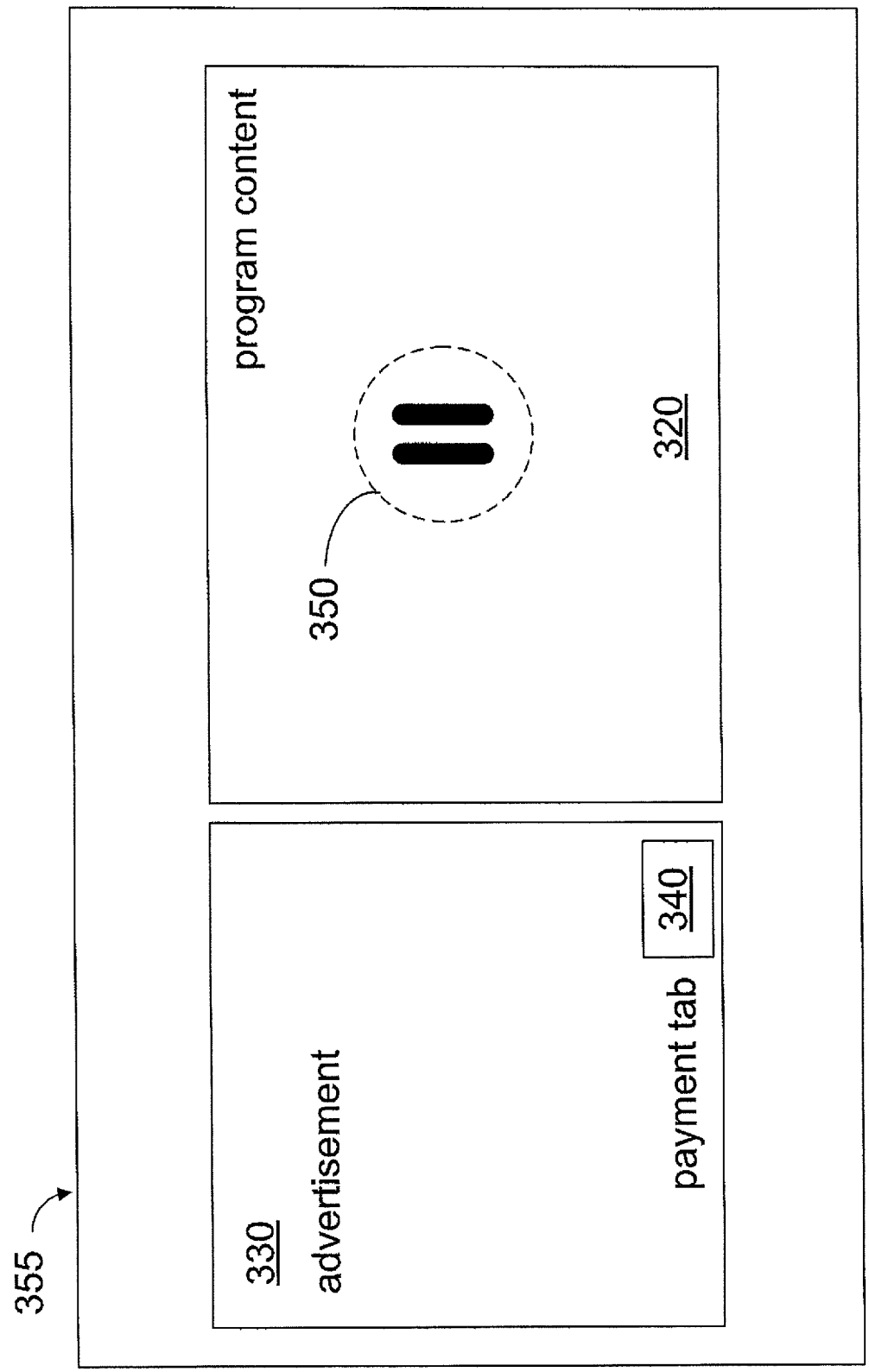
FIG. 3 shows a display in a system for targeted broadcast advertising, according to some embodiments.

FIG. 3 shows a display 355 in a system for targeted broadcast advertising, according to some embodiments. Display 355 includes a canvas to display a program content 320 and an advertisement field 330 to display an advertisement. In some embodiments advertisement field 330 includes a payment tab 340, as described in detail above in relation to payment tab 240 (cf. FIG. 2). Thus, a viewer interested in purchasing some of the advertised products may select payment tab 340 and complete a transaction while pausing the program broadcasted by broadcaster 110. Thus, embodiments consistent with the present disclosure provide real-time targeted marketing.

According to some embodiments illustrated in FIG. 3, advertisement field 330 may be displayed to the side of display 355, upon viewer 160 taking a specific action on the video display, such as pressing the 'pause' button, as shown by a 'pause' indicator 350. Further according to some embodiments, a product or service advertised in advertisement field 330 may be related to a product or service being displayed as part of program content 320. In some embodiments, the product or service advertised in advertisement field 330 may also be related to the content of a close captioning associated to program content 320. In some embodiments, advertisement field 330 displays a product or service related to a close captioning in program content 320 whether or not viewer 160 has the 'close captioning' option 'on,' in display 355.

In some embodiments, a viewer action on display 355 may be a tap on the screen. For example, viewer 160 may tap on an item that appears on program content 320. If the item is related to a product offered for sale by a vendor 105 having a contract with broadcaster 110, then program content 320 may be paused and advertisement field 330 displayed, including purchase information for the item.

For example, if vendor 105 offers watches for sale, then broadcaster 110 may include a tapping option on portions of video frames showing people wearing certain watches. The tapping option may work on viewing device 150 having a touch screen capability. In some embodiments, the tapping option may work with a click on a cursor that may be moved on top of the portion of the video frame selected by viewer 160.

According to some embodiments, viewer 160 may be down-streaming a movie from an Internet outlet. As the movie progresses, a character in the movie makes a remark including a device or service that may be offered for sale by vendor 105. When program content 320 also displays an image of the device offered for sale by vendor 105, a high correlation between the screen display, the close captioning, and the vendor's keyword may prompt display 355 to run advertisement field 330 promoting vendor's 105 product or service. For example, advertisement field 330 may be displayed upon viewer 160 'pausing' program 320 on display 355. In some embodiments, viewer 160 may decide to 'pause' program 320 upon seeing a small advertisement on the screen during downstream, such as in advertisement field 230 in display 255 (cf. FIG. 2). Thus, in such embodiments advertisement field 330 may provide further details about the product or service offered for sale by vendor 105. For example, advertisement field 330 may include price, availability, and any other information about a product or service, such as store location, and other related products or services offered by vendor 105.

According to some embodiments, viewer 160 may be watching a broadcast of a regular TV show in program content 320. As viewer 160 notices an item, utensil or service of interest in program content 320, the viewer may 'pause' the program 350 to take note of the item, utensil, or service of interest. As a result, display 355 shows advertisement field 330 including the item, utensil, or service of interest.

Figure 4:
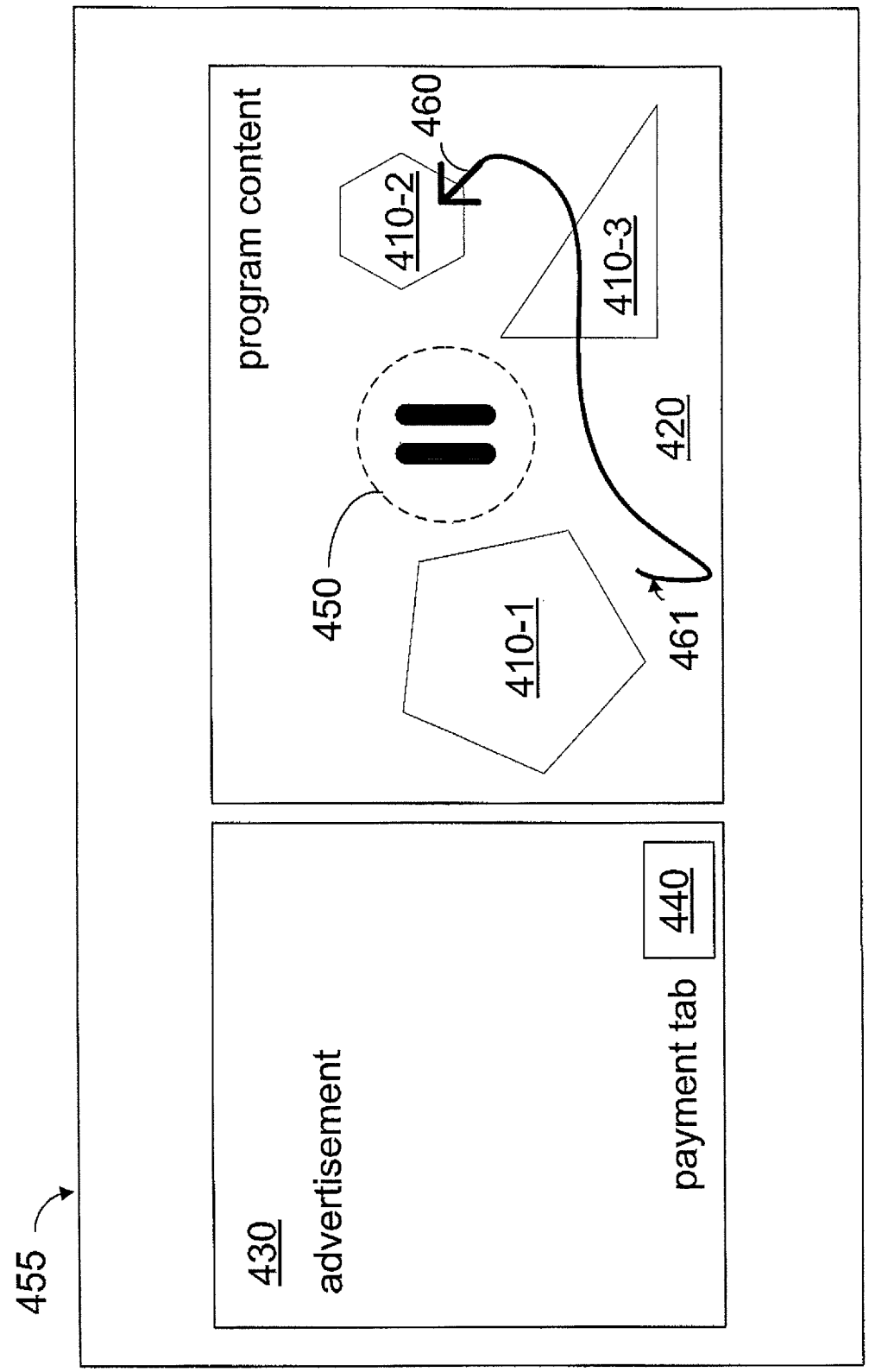
FIG. 4 shows a display in a system for targeted broadcast advertising, according to some embodiments.

FIG. 4 shows a display 455 in a system for targeted broadcast advertising according to some embodiments. Display 455 includes a canvas to display the program content 420, and an advertisement field 430 to display an advertisement. In some embodiments advertisement field 430 includes a payment tab 440, as described in detail above in relation to payment tabs 240 and 340 (cf. FIGS. 2 and 3 above). FIG. 4 illustrates a cursor 460 following a trajectory 461 within program content 420. Trajectory 461 hovers over enabled items 410-1, 410-2, and 410-3 (collectively referred to as enabled items 410) within program content 420. Cursor 460 may be controlled by viewer 160 that has 'paused' program content 420 as indicated by 'pause' indicator 450, upon finding interest on either one, or more than one, of enabled items 410. Thus, as cursor 460 hovers over either of enabled items 410, vendor information for the items may be displayed in advertisement field 430. Further, in some embodiments broadcaster 110 may enable the option for viewer 160 to tap or double click on a selected one of enabled items 410 to find more detailed information about the specific item. In some embodiments, payment tab 440 may be enabled upon tapping or double clicking on a selected enabled item 410.

According to some embodiments, broadcaster 110 selects enabled items 410 upon signing a contract agreement with vendors associated with either one of the items. Once a viewer 160 becomes familiarized with methods and systems for targeted broadcast advertising as disclosed herein, viewer 160 may be trained to enable 'pause' 450 on the video downstream, and browse through the frozen frame for an item of interest using cursor 460. In some embodiments, upon 'pausing' program content 420, enabled items 410 may show flashing borderlines, or bright-colored fillings. Thus, in some embodiments viewer 160 may easily detect which items in the video frame are available for purchasing on a given frame.

Figure 5:
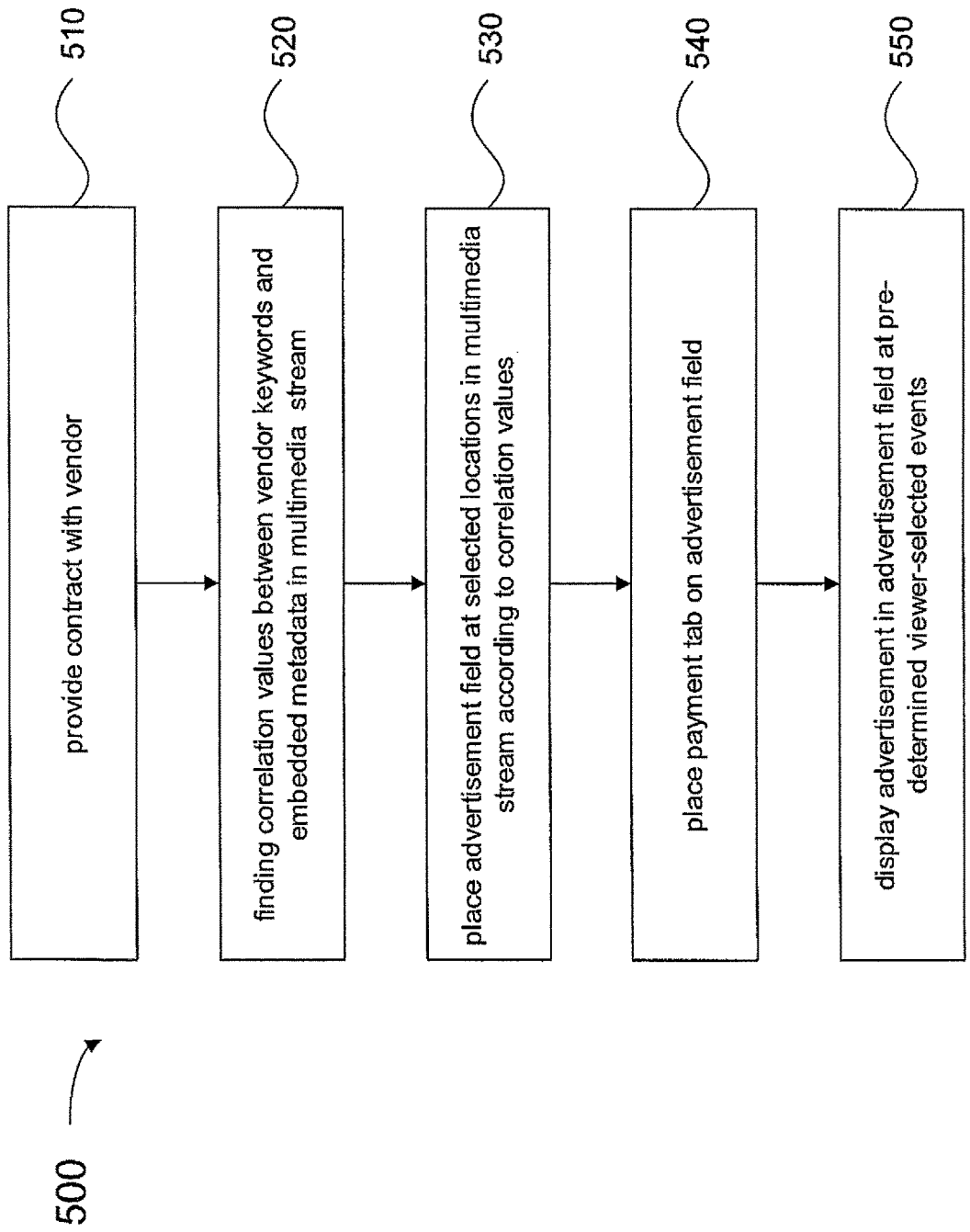
FIG. 5 shows a flow chart in a method for providing targeted broadcast advertising, according to some embodiments.

FIG. 5 shows a flow chart in a method 500 for providing targeted broadcast advertising according to some embodiments. According to some embodiments, method 500 may be performed by a broadcaster that produces video programs for an audience that may be reached via traditional antenna transmissions, a cable network, or the internet. The broadcaster performing method 500 may be as broadcaster 110 performing the steps in FIG. 5 electronically, using processor 112 acting from commands and data stored in memory 113 (cf. FIG. 1). The internet may include a cell phone network, a wireless network, an Ethernet network, or any combination of the above. The broadcaster provides multimedia data streams to the audience through the network. The audience may receive and display the multimedia data stream using a viewing device such as device 150 (cf. FIG. 1).

In step 510 the broadcaster provides a contract to a vendor. According to some embodiments, the vendor may provide a keyword set to the broadcaster upon agreeing to a contract in step 510. In step 520, the broadcaster finds correlation values between the vendor keywords and embedded metadata in a multimedia data stream to be broadcasted. The embedded metadata may include the close captioning for the program provided by the broadcaster. The embedded metadata may also include a description of the display content. Video editing programs have annotations and metadata relating to the video content as embedded metadata. Strong correlation between what is being said and what is being shown on the screen increases the probability of displaying an advertisement.

For example, in step 520 a vendor that sells wrist watches may provide the keyword 'watch,' 'durable,' 'water resistant' as part of keyword 107 provided to a broadcaster. The broadcaster then matches the above keyword with the close caption of a multimedia stream. If the close captioning for a given frame of the stream includes all of the keyword 'watch,' 'durable,' and 'water resistant,' than a high correlation value may be found. Furthermore, if the frame itself includes the image of a wrist watch used underwater, then a correlation value may be set even higher. Once the correlation value is higher than a pre-determined threshold, then an advertisement provided by the wrist watch vendor may be displayed by the broadcaster. In some embodiments, the advertisement may be displayed in parallel with the program content, as in advertisement field 230 (cf. FIG. 2). Then, the interested viewer may press on the 'pause' button in order to display a larger advertisement field 330 (cf. FIG. 3).

In step 530 the broadcaster places an advertisement field at selected locations in multimedia stream 120. In some embodiments, broadcaster 110 places advertisements 123 in an advertisement field such as 230, 330, or 430 described in detail above (cf. FIGS. 2, 3, and 4). The location within multimedia stream 120 selected by broadcaster 110 to place advertisements 123 include a point where high correlation value is found between keywords 107, close captioning 121, and the visual display. Moreover, points where broadcaster 110 places advertisements 123 in multimedia stream 120 may vary for different broadcasts of the same multimedia stream. Thus, when the contract provided in step 510 expires, broadcaster 110 may remove advertisements 123 related to vendor 105. In some embodiments, broadcaster 110 may include a 'rotating' scheme for placing advertisements 123 in multimedia stream 120. For example, more than one vendor 105 may desire to have advertisements 123 having similar keywords placed on 'prime' locations in multimedia stream 120. This may be the case for vendors 105 from a particular industry, such as automakers, in action movies, or car racing movies. Thus, broadcaster 110 may alternate advertisements 123 from different vendors 105 at the same or similar spot in multimedia stream 120.

In step 540 the broadcaster places a payment tab on the advertisement field. The payment tab may be as payment tab 240, 340, or 440 described in detail above (cf. FIGS. 2, 3, and 4). The payment tab may establish a direct link between viewer 160 and service provider 101. For example, service provider 101 may contact viewer 160 through link 171 (cf. FIG. 1). Thus, viewer 160 may purchase an item being advertised using methods and systems for targeted broadcast advertisement as disclosed herein. When viewer 160 presses or taps on a payment tab, the broadcaster may transmit a message to the service provider that a viewer is interested in a selected product from a vendor. The service provider may be configured to contact the vendor and the viewer to finalize purchasing transactions according to embodiments of method 500.

In step 550 the broadcaster displays advertisements 123 at a pre-determined, viewer-selected event. To create a high impact upon viewer 160 when showing the advertisements, advertisements 123 may be displayed when viewer 160 pauses the program. Thus, the viewer-selected event in step 550 may include a 'pause' action or any other action on the multimedia stream (cf. FIG. 3). Different points in the downstream of the program content may include different advertisements mapped to what is being displayed or talked about within the program. For example, multiple advertisements may be determined between a first pause and a second pause by the viewer in a multimedia downstream, according to correlation matches between the first and second pause. In such embodiments, step 550 may include the broadcaster displaying the multiple advertisements at the second pause by the viewer. In some embodiments, in step 550 the broadcaster may choose to display a selected advertisement from the multiple advertisements having a correlation match. The selected advertisement may correspond to a vendor that has placed a bid with the broadcaster to display the advertisement. In some embodiments, while multiple vendors may each place a bid with the broadcaster, the broadcaster may choose the selected advertisement according to the highest bid received.

Figure 6:
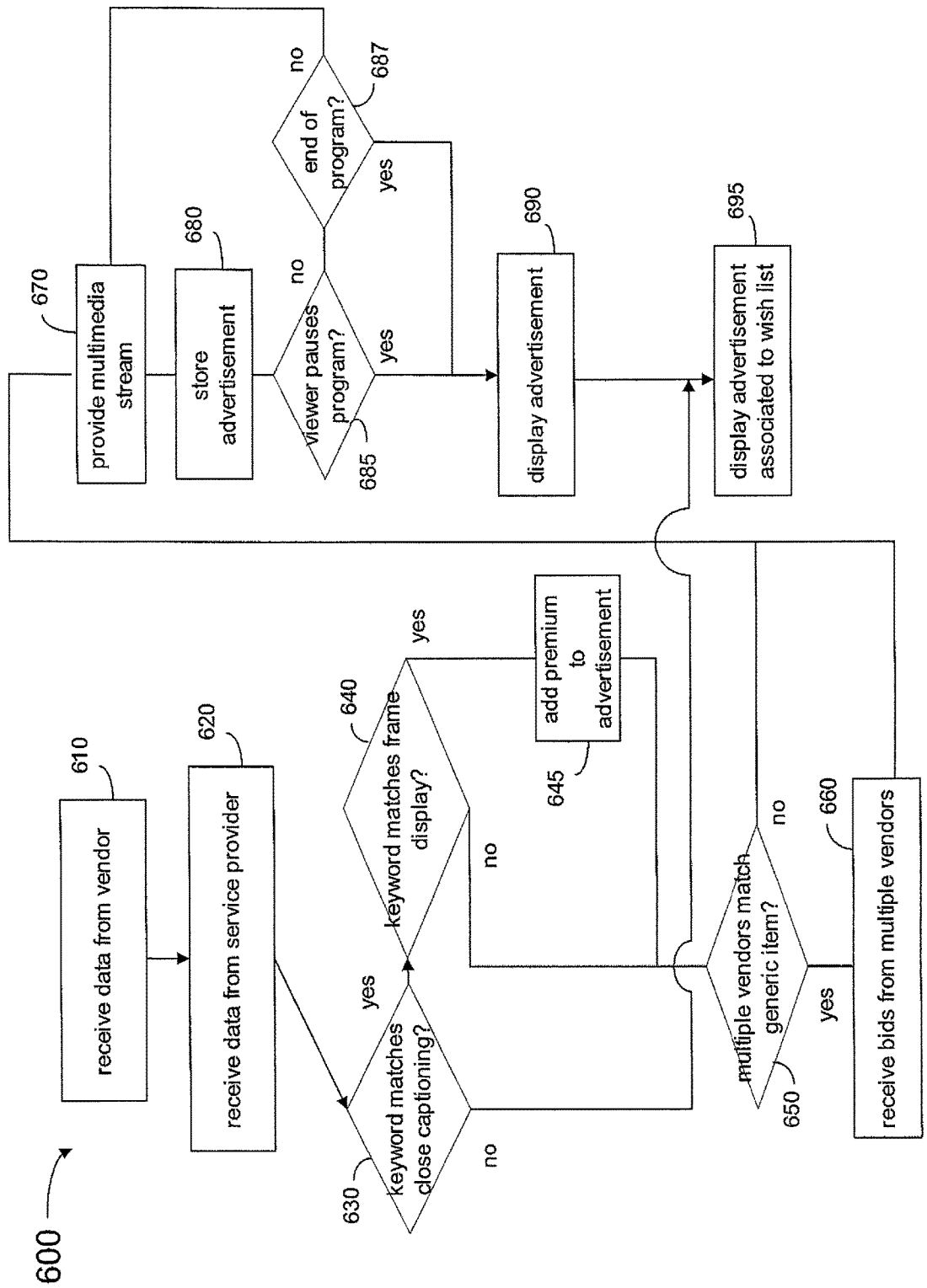
FIG. 6 shows a flow chart in a method for providing targeted broadcast advertising, according to some embodiments.

FIG. 6 shows a flow chart in a method 600 for providing targeted broadcast advertising according to some embodiments. According to some embodiments, method 600 may be performed by a broadcaster that produces video programs for an audience that may be reached via traditional antenna transmissions, a cable network, or the Internet. The broadcaster performing method 600 may be as broadcaster 110 performing the steps in FIG. 6 electronically, using processor 112 acting from commands and data stored in memory 113 (cf. FIG. 1).

In step 610 the broadcaster receives data from a vendor after signing a contract to display advertisements of vendor's products or services. The data may include a set of keywords associated to products or services provided by the vendor. A service provider such as private account service provider 101 may also have a contract with the broadcaster to provide a method for online payment of products and services advertised by the broadcaster. According to some embodiments, a vendor having a contract with the broadcaster may also have a private account with the service provider. Furthermore, a viewer having access to program down stream from the broadcaster may also have a private account with the service provider. The viewer may be as viewer 160 described in detail above (cf. FIG. 1). Thus, in step 620 the broadcaster may receive data from the service provider. The data received in step 620 may be a wish list of items that the viewer may be interested in purchasing, or may consider purchasing. The wish list received by the broadcaster in step 620 may be as wish list 104 described in detail above (cf. FIG. 1).

In step 630 the broadcaster determines if the keywords provided by the vendor match a close captioning of a program content that the broadcaster provides to viewers. If the vendor keywords do not match the close captioning of a given program content, the broadcaster may display advertisements associated to products and services included in the wish list provided by the user, in step 695. If the vendor keywords match the close captioning at some point of the stream, then in step 640 the broadcaster determines if the vendor keywords also match a visual element in a frame of the display associated to the close captioning. For example, the broadcaster may perform step 640 by using a metadata associated with the multimedia downstream including the program content. If the broadcaster finds a match in step 640, then the broadcaster includes a premium for the vendor to pay in an advertisement associated to the product or service matched in step 640.

Whether or not a match is found in step 640, in step 650 it is determined if multiple vendors have keywords matching the close captioning (step 630) or the frame display (step 640). For example, multiple vendors may provide keywords for a generic item (e.g. 'cars' or 'travel') that matches a word in the close captioning, and a portion of an image in the frame display. When the broadcaster determines that no more than one vendor has a match in step 650, then the broadcaster provides multimedia stream to the viewer in step 670. When the broadcaster determines in step 650 that more than one vendor has a match, then in step 660 the broadcaster requests and receives bids from the vendors that have a match. In step 660 the broadcaster may determine to display an advertisement for the highest bidder. In some embodiments, in step 660 the broadcaster may determine a probability function weighted according to the bid received from the vendors. In such embodiments, the broadcaster may display an advertisement associated to a specific vendor according to the probability function.

In step 670 the broadcaster provides the multimedia stream including the program content to the viewer. In step 680 the broadcaster stores the advertisement in a memory circuit, such as memory circuit 113 described in detail above (cf. FIG. 1). In step 685 the broadcaster determines if the viewer has paused the program stream. If the user has not paused the program, then in step 687 the broadcaster determines if the program has ended. If the program has not ended, then the broadcaster continues to provide multimedia stream in step 670. If the broadcaster determines in step 687 that the program has ended, or in step 685 that the viewer has paused the program, then in step 690 the broadcaster displays the advertisement stored in step 680 for the viewer. In some embodiments, multiple advertisements may be displayed in step 690, as the broadcaster memory circuit may have more than one advertisement stored. For example, in some embodiments the broadcaster may repeat steps 630 through 680 in multiple portions of a multimedia stream, before a user pauses the program in step 685, or the program ends in step 687.

In some embodiments, method 600 may include step 695 where the broadcaster displays advertisements for products or services in the viewer's wish-list provided by the service provider. In some embodiments, in step 695 the broadcaster may display products or services under promotion by a vendor, or a product that a vendor desires to place in the market, at a premium price for the vendor.

Embodiments of the invention described above are exemplary only. One skilled in the art may recognize various alternative embodiments from those specifically disclosed. Those alternative embodiments are also intended to be within the scope of this disclosure. As such, the invention is limited only by the following claims.

What is claimed is:

1. A broadcasting system for targeted broadcast advertising comprising:
    a non-transitory memory; and
    one or more hardware processors coupled to the non-transitory memory and configured to read instructions from the non-transitory memory to cause the broadcasting system to perform operations comprising:
        providing a multimedia stream to a viewing device through a broadcasting medium, the multimedia stream comprising program content and a closed captioning string associated with the program content;
        in response to detecting an access of a private account of a viewer of the viewing device with a third party private account service provider via a communication link established between the viewing device and the third party private account service provider, receiving, from the third party private account service provider, a viewer-specific wish list describing a first product and a third product that the viewer may be interested in purchasing;
        storing a first advertisement for a second product offered by a vendor and one or more vendor-specific keywords describing the second product;
        storing a second advertisement for a fourth product offered by a vendor and one or more vendor-specific keywords describing the fourth product;
        determining a correlation match between the first product, the second product, and the program content of the multimedia stream by correlating language in the viewer-specific wish list describing the first product, the one or more vendor-specific keywords describing the second product, and the closed captioning string associated with the program content;
        in response to determining the correlation match, providing the first advertisement in the multimedia stream such that the program content is streamed continuously for display at the viewing device while the first advertisement is being displayed in parallel with the program content at the viewing device;
        determining, subsequent to the first advertisement being displayed in parallel with the program content at the viewing device, a correlation match between the third product, the fourth product, and the program content of the multimedia stream by correlating language in the viewer-specific wish list, the one or more vendor-specific keywords, and the closed captioning string; and
        in response to determining the correlation match between the third product, the fourth product, and the program content of the multimedia stream, providing the second advertisement that is different than the first advertisement in the multimedia stream such that the program content is streamed continuously for display at the viewing device while the second advertisement is being displayed in parallel with the program content at the viewing device.

2. The broadcasting system of claim 1, wherein the program content of the multimedia stream further comprises a video frame and metadata associated with contents of the video frame.

3. The broadcasting system of claim 2, wherein the correlation match is further determined based on the metadata.

4. The broadcasting system of claim 1, wherein the operations further comprise adding a cost for the vendor in response to determining the correlation match.

5. A non-transitory machine-readable medium comprising a plurality of machine-readable instructions executable to cause a machine to perform operations comprising:
    broadcasting a multimedia stream to a viewing device through a broadcasting medium, the multimedia stream comprising program content and a closed captioning stream associated with the program content;
    in response to detecting an interaction with an interactive tab associated with the multimedia stream, providing a communication link between the viewing device and a third party private account service provider associated with a private account of a viewer of the viewing device;
    in response to detecting an access of the private account with the third party private account service provider via the communication link, receiving, from the third party private account service provider, a viewer-specific wish list describing a first product that the viewer may be interested in purchasing and a third product that the viewer may be interested in purchasing;
    storing a first advertisement for a second product offered by a vendor and one or more vendor-specific keywords describing the second product;
    storing a second advertisement for a fourth product offered by a vendor and one or more vendor-specific keywords describing the fourth product;
    determining a correlation match between the first product, the second product, and the program content of the multimedia stream by correlating language in the viewer-specific wish list describing the first product, the one or more vendor-specific keywords describing the second product, and the closed captioning stream associated with the program content;
    providing the first advertisement in the multimedia stream according to the correlation match such that the program content is streamed continuously for display at the viewing device while the first advertisement is being displayed in parallel with the program content at the viewing device;
    determining, subsequent to the first advertisement being displayed in parallel with the program content at the viewing device, a correlation match between the third product, the fourth product, and the program content of the multimedia stream by correlating language in the viewer-specific wish list, the one or more vendor-specific keywords, and the closed captioning stream; and in response to determining the correlation match between the third product, the fourth product, and the program content of the multimedia stream, providing the second advertisement that is different than the first advertisement in the multimedia stream such that the program content is streamed continuously for display at the viewing device while the second advertisement is being displayed in parallel with the program content at the viewing device.

6. The non-transitory machine-readable medium of claim 5, wherein the program content of the multimedia stream further comprises a video frame and metadata associated with contents of the video frame.

7. The non-transitory machine-readable medium of claim 6, wherein the correlation match between the first product, the second product, and the program content of the multimedia stream is further determined based on the metadata.

8. A method for targeted broadcast advertising comprising:

providing a multimedia stream to a viewing device, the multimedia stream comprising program content and a closed captioning string associated with the program content;

in response to detecting an access of a private account of a viewer of the viewing device associated with a third party account provider via a communication link established between the viewing device and the third party account provider, receiving, from the third party account provider, a wish list associated with the private account, the wish list describing a first item and a third item;

accessing one or more keywords related to a second item in a first advertisement;

accessing one or more keywords related to a fourth item in a second advertisement;

determining a correlation match between the first item, the second item, and the program content of the multimedia stream by correlating content in the wish list describing the first item, the one or more keywords related to the second item, and the closed captioning string associate with the program content;

placing an advertisement field for the second item at selected locations in the multimedia stream according to the correlation match;

placing a payment tab on the advertisement field;

providing the first advertisement in the advertisement field such that the program content is streamed continuously for display at the viewing device while the first advertisement is being displayed in the advertisement field in parallel with the program content at the viewing device;

determining, subsequent to the first advertisement being displayed in parallel with the program content at the viewing device, a correlation match between the third item, the fourth item, and the program content of the multimedia stream by correlating content in the wish list describing the third item, the one or more keywords related to the fourth item, and the closed captioning string associated with the program content; and providing the second advertisement in the advertisement field that is different than the first advertisement such that the program content is streamed continuously for display at the viewing device while the second advertisement is being displayed in the advertisement field in parallel with the program content at the viewing device.

9. The method of claim 8, wherein the determining the correlation match between the first item, the second item, and the program content of the multimedia stream is further based on an embedded metadata in the multimedia stream.

10. The method of claim 8, further comprising:

requesting a bid from each of a plurality of vendors having keywords correlated to the closed captioning string.

11. The method of claim 10 wherein, providing the first advertisement comprises selecting an advertisement for a vendor with a highest bid from the plurality of vendors.

12. The broadcasting system of claim 1, wherein the operations further comprise prompting the viewer to enter private account credentials associated with the private account in response to detecting an interaction with an interactive tab.

13. The broadcasting system of claim 1, wherein the communication link provides a communication path for the third party private account service provider to contact the viewer.

14. The broadcasting system of claim 1, wherein the vendor has a second private account with the third party private account service provider.

15. The broadcasting system of claim 14, wherein the operations further comprise facilitating a purchase of the second product by the viewer in response to detecting an interaction with the first advertisement.

16. The broadcasting system of claim 1, wherein the communication link includes a direct link between the viewer and the third party private account service provider that bypasses the broadcasting system.

17. The broadcasting system of claim 1, wherein the first advertisement is displayed at the viewing device in an advertisement field that is displayed with the program content.

18. The non-transitory machine-readable medium of claim 5, wherein the first advertisement is displayed at the viewing device in an advertisement field that is displayed with the program content.

* * * * *